(12) United States Patent  (10) Patent No.: US 8,832,481 B2
Lin                        (45) Date of Patent:    Sep. 9, 2014

(54) PORTABLE ELECTRONIC DEVICE AND METHOD FOR CONTROLLING SCREEN PROTECTION FUNCTION OF THE PORTABLE ELECTRONIC DEVICE

(75) Inventor: Le Lin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 409 days.

(21) Appl. No.: 13/327,777

(22) Filed: Dec. 16, 2011

(65) Prior Publication Data

US 2012/0254646 A1  Oct. 4, 2012

(30) Foreign Application Priority Data

Mar. 28, 2011  (CN) .......................... 2011 1 0075156

(51) Int. Cl.
G06F 1/32       (2006.01)
G06F 3/0488     (2013.01)
G06F 1/16       (2006.01)

(52) U.S. Cl.
CPC ............ *G06F 3/0488* (2013.01); *G06F 1/1694* (2013.01); *G06F 1/3206* (2013.01); *G06F 1/3265* (2013.01); *G06F 2200/1637* (2013.01); *Y02B 60/1242* (2013.01)

USPC ............................ 713/323; 713/320; 713/324

(58) Field of Classification Search
CPC ... G06F 1/1694; G06F 1/3206; G06F 1/3265; G06F 3/0488; G06F 2200/1637; Y02B 60/1242
See application file for complete search history.

(56) References Cited

U.S. PATENT DOCUMENTS

2007/0075127 A1*  4/2007  Rosenberg ..................... 235/375
2009/0195497 A1*  8/2009  Fitzgerald et al. ............ 345/156
2012/0176353 A1*  7/2012  Ishii .............................. 345/204
2013/0060515 A1*  3/2013  Wei et al. ...................... 702/141

* cited by examiner

*Primary Examiner* — Dennis M Butler
(74) *Attorney, Agent, or Firm* — Novak Druce Connolly Bove + Quigg LLP

(57) ABSTRACT

In a method for controlling a screen protection function of a portable electronic device, the portable electronic device includes a gravity sensor, a display screen, and a storage system. The gravity sensor detects a horizontal vector and a vertical vector of a gravitational acceleration of the portable electronic device, and a tilt angle of the portable electronic device is calculated according to the horizontal vector and the vertical vector. The method activates a screen protection program of the portable electronic device to control the display screen to enter into a power saving mode if the tilt angle exceeds a preset tilt angle range stored in the storage system, and terminates the screen protection program to control the display screen to enter into a normal display mode if the tilt angle does not exceed the preset tilt angle range.

18 Claims, 3 Drawing Sheets

PORTABLE ELECTRONIC DEVICE AND METHOD FOR CONTROLLING SCREEN PROTECTION FUNCTION OF THE PORTABLE ELECTRONIC DEVICE

BACKGROUND

1. Technical Field

The embodiments of the present disclosure relate to computing device control methods, and more particularly to a portable electronic device and a method for controlling a screen protection function of the portable electronic device.

2. Description of Related Art

To reduce power consumption of a portable electronic device, such as a notebook, a tablet device, a personal digital assistant (PDA), or a mobile phone, it is necessary to put a display screen of the portable electronic device into a power saving mode when the display screen is free, and revert to a normal display when the display screen is to be used. In common methods, the user may be set a time interval (e.g., 30 seconds) for the application of the power saving mode according to user's demands. If the display screen remains free and the time interval elapses, a screen protection function of the portable electronic device is invoked to control the display screen to enter into the power saving mode. When the user wants to view information displayed on the display screen, the user should move a mouse or a input key of the portable electronic device to make the display screen enter into the normal display mode. However, it is not totally convenient for the user to set a time interval or to operate the portable electronic device. Therefore, it is desirable to have a method for automatically controlling a screen protection function of the portable electronic device.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
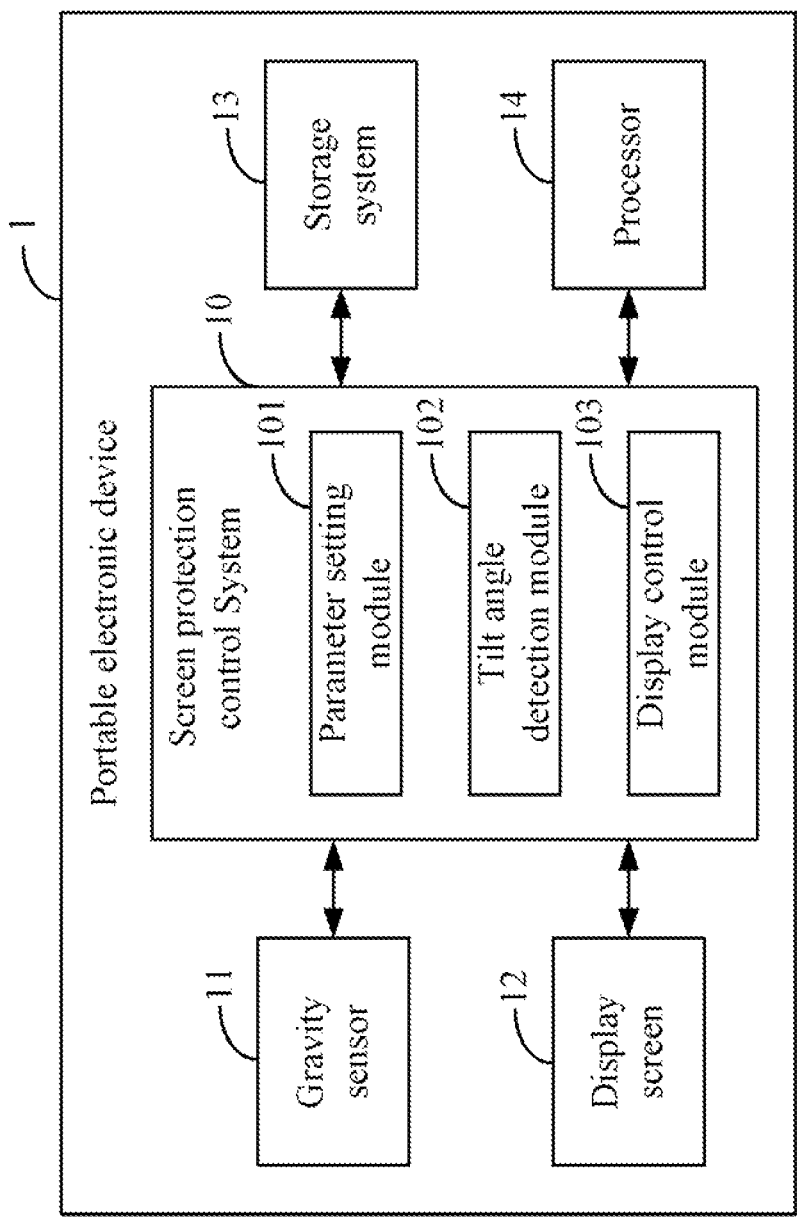
FIG. 1 is a block diagram of one embodiment of a portable electronic device including a screen protection control system.

FIG. 1 is a block diagram of one embodiment of a portable electronic device 1 including a screen protection control system 10. In the embodiment, the portable electronic device 1 may further include a gravity sensor 11, a display screen, a storage system 13, and at least one processor 14. The screen protection control system 10 can communicate with the gravity sensor 11, the display screen, the storage system 13 and the at least one processor 14. In one embodiment, the portable electronic device may be a notebook, a tablet device, a personal digital assistant (PDA) or a mobile phone, for example. It is understood that FIG. 1 is only one example of the portable electronic device 1 that can include more or fewer components than those shown in the embodiment, or have a different configuration of the various components.

The screen protection control system 10 may include a plurality of functional modules that are executed by the at least one processor 14, to automatically control a screen protection function of the portable electronic device 1 to make the display screen 12 in a normal display mode or a power saving mode. In the embodiment, the power saving mode is defined as a display mode of the display screen 12 that works in a low power state when the display screen 12 is free. The power saving mode can be converted into the normal mode for normally displaying information of the portable electronic device 1 when the display screen 12 is being used.

The gravity sensor 11 is configured to detect a horizontal vector and a vertical vector of a gravitational acceleration of the portable electronic device 1 in real time when the portable electronic device 1 is placed at different tilt angles. In one embodiment, the gravity sensor 11 may be a voltage sensor, a capacitive sensor, or an inductive sensor. For user viewing in a comfortable and expedient manner, the portable electronic device 1 may be placed at different tilt angles. In one example with respect to FIG. 3, the portable electronic device 1 may be placed at a tilt angle (denoted as an angle "θ"). The portable electronic device 1 generates a gravitational acceleration (denoted as an angle "G" in FIG. 3) according to the gravity, and the gravity sensor 11 can detect a horizontal vector (denoted as a vector "Gx") and a vertical vector (denoted as a vector "Gy") of the gravity acceleration of the portable electronic device 1.

The display screen 12 may be a light-emitting diode (LED) screen or a liquid crystal display (LCD) for displaying information of the portable electronic device 1. In one embodiment, the storage system 13 may be an internal storage system, such as a random access memory (RAM) for the temporary storage of information, and/or a read only memory (ROM) for the permanent storage of information. In some embodiments, the storage system 13 may also be an external storage system, such as an external hard disk, a storage card, or a data storage medium. The at least one processor 14 may be a central processing unit or a microcontroller unit, for example.

In the embodiment, the screen protection control system 10 includes a parameter setting module 101, a tilt angle detection module 102, and a screen protection control module 103. The modules 101-103 may comprise computerized instructions in the form of one or more programs that are stored in the storage system 13 and executed by the at least one processor 14 to provide functions for implementing the modules. A detailed description of each module will be given in the following paragraphs.

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other non-transitory storage device. Some non-limiting examples of non-transitory computer-readable media include CDs, DVDs, flash memory, and hard disk drives.

Figure 2:
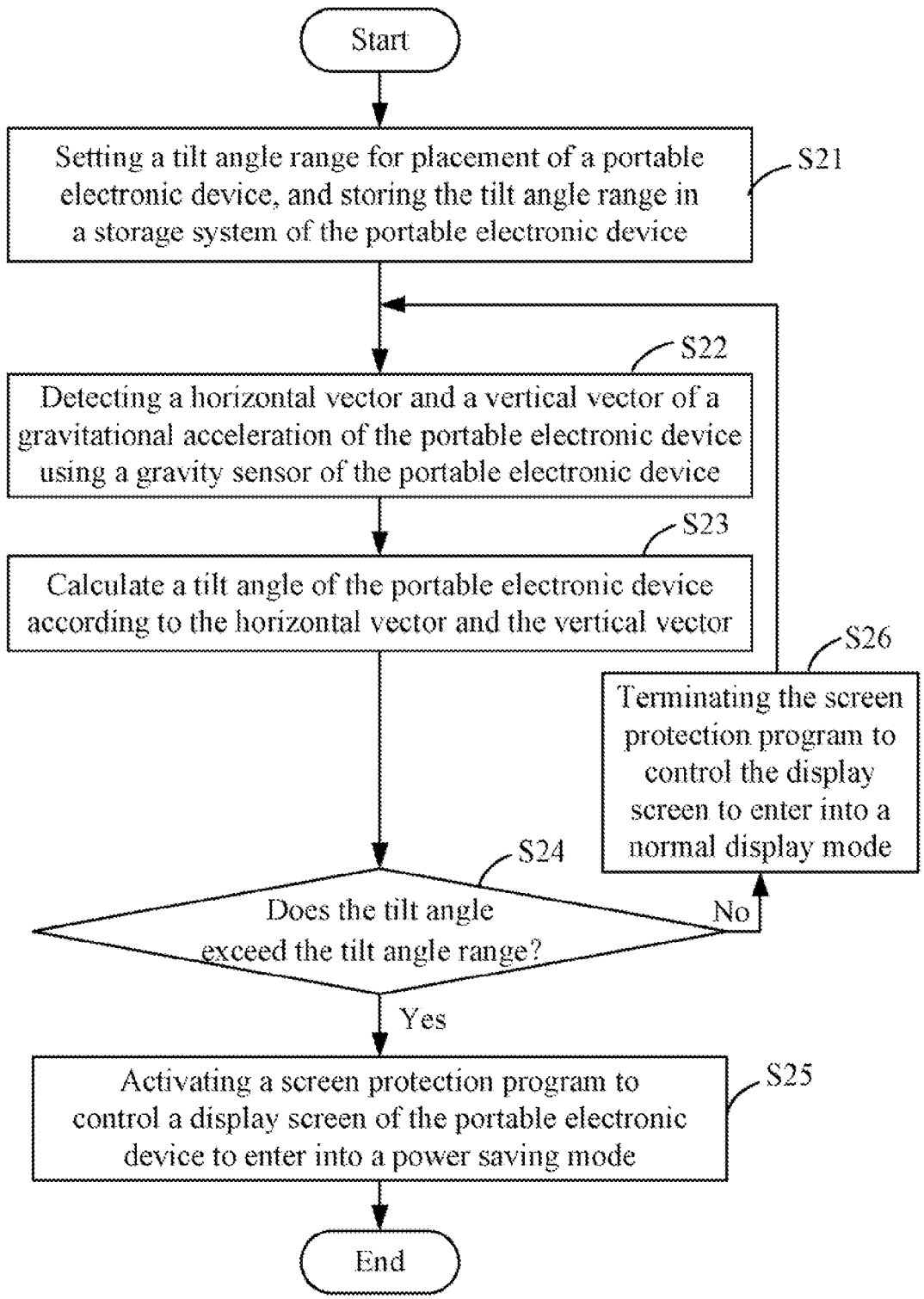
FIG. 2 is a flowchart of one embodiment of a method for controlling a screen protection function of the portable electronic device of FIG. 1.

FIG. 2 is a flowchart of one embodiment of a method for controlling a screen protection function of the portable electronic device 1 of FIG. 1. In the embodiment, the method can automatically control a screen protection function of the portable electronic device 1 to make the display screen 12 in a normal display mode or in a power saving mode, so as to reduce the power consumption of the portable electronic device 1. Depending on the embodiment, additional blocks may be added, others removed, and the ordering of the blocks may be changed.

In block S21, the parameter setting module 101 sets a tilt angle range for placement of the portable electronic device 1, and stores the tilt angle range in the storage system 13. In one embodiment, the tilt angle range can be set as an angle range between 30 degrees and 60 degrees from the horizontal level according to user's demands.

Figure 3:
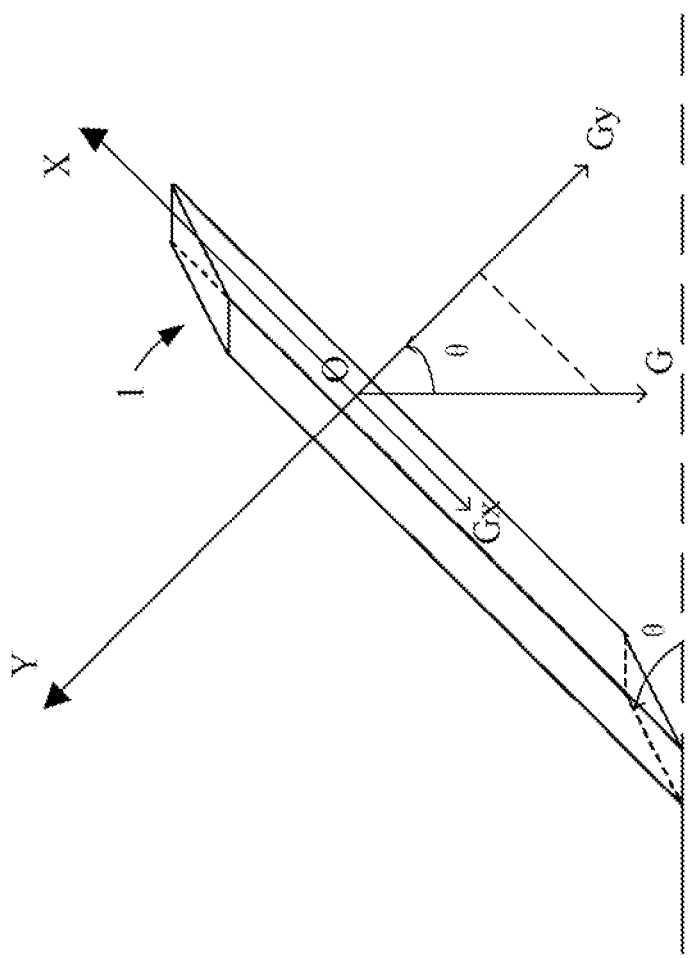
FIG. 3 is a schematic diagram illustrating an example of the portable electronic device at a tilt angle.

In block S22, the tilt angle detection module 102 detects a horizontal vector and a vertical vector of the gravitational acceleration of the portable electronic device 1 using the gravity sensor 11. Referring to FIG. 3, the portable electronic device 1 may be placed at a tilt angle (denoted as an angle "θ"). The portable electronic device 1 generates the gravitational acceleration (denoted as an angle "G") according to the gravity of the portable electronic device 1, and the tilt angle detection module 102 can detect the horizontal vector (denoted as a vector "Gx") and the vertical vector (denoted as a vector "Gy") of the gravity acceleration "G" using the gravity sensor 11.

In block S23, the tilt angle detection module 102 calculates a tilt angle of the portable electronic device 1 according to the horizontal vector and the vertical vector. Referring to FIG. 3, the portable electronic device 1 may be placed at a tilt angle (denoted as an angle "θ"). In one embodiment, the tilt angle "θ" may be calculated according to a formula: θ=Arctan(Gx/Gy), where "θ" is the tilt angle of the portable electronic device 1 as shown in FIG. 3, and "Arctan" is an inverse trigonometric function.

In block S24, the screen protection control module 103 determines whether the tilt angle exceeds the preset tilt angle range. If the tilt angle exceeds the preset tilt angle range, block S25 is implemented. Otherwise, if the tilt angle does not exceed the preset tilt angle range, block S26 is implemented.

In block S25, the screen protection control module 103 activates a screen protection program of the portable electronic device 1 to control the display screen 12 to enter into a power saving mode. In one embodiment, the power saving mode is defined as a display mode of the display screen 12 that works in a low power state, to reduce the power consumption of the portable electronic device 1. The screen protection program is stored in the storage system 13, and is activated in the portable electronic device 1 when the display screen 12 is free.

In block S26, the screen protection control module 103 terminates the screen protection program to control the display screen 12 to enter into a normal display mode. In one embodiment, the normal display mode is defined as a display mode of the display screen 12 for normally displaying information of the portable electronic device 1 when the display screen 12 is being used.

In the embodiment, the gravity sensor 11 can detect the horizontal vector and the vertical vector of the gravitational acceleration of the portable electronic device 1 when the portable electronic device 1 is placed at any different tilt angle. Therefore, the screen protection program can be invoked or terminated at any time according to the tilt angle according to the horizontal vector and the vertical vector of the gravitational acceleration, so as to reduce the power consumption of the portable electronic device 1.

All of the processes described above may be embodied in, and fully automated via, functional code modules executed by one or more general purpose processors of electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
a gravity sensor and a display screen;
a storage system and at least one processor; and
one or more programs stored in the storage system and executed by the at least one processor, the one or more programs comprising:
a parameter setting module that sets a tilt angle range for placement of the portable electronic device, and stores the tilt angle range in the storage system;
a tilt angle detection module that detects a horizontal vector and a vertical vector of a gravitational acceleration of the portable electronic device using the gravity sensor, and calculates a tilt angle of the portable electronic device according to the horizontal vector and the vertical vector; and
a screen protection control module that determines whether the tilt angle exceeds the preset tilt angle range, and activates a screen protection program of the portable electronic device to control the display screen to enter into a power saving mode if the tilt angle exceeds the preset tilt angle range, or terminates the screen protection program to control the display screen to enter into a normal display mode if the tilt angle does not exceed the preset tilt angle range.

2. The portable electronic device according to claim 1, wherein the tilt angle of the portable electronic device is calculated according to an inverse trigonometric function of the horizontal vector and the vertical vector.

3. The portable electronic device according to claim 1, wherein the gravity sensor is a voltage sensor, a capacitive sensor, or an inductive sensor.

4. The portable electronic device according to claim 1, wherein the power saving mode is defined as a display mode of the display screen that works in a low power state when the display screen is free.

5. The portable electronic device according to claim 1, wherein the normal display mode is defined as a display mode of the display screen for normally displaying information of the portable electronic device when the display screen is being used.

6. The portable electronic device according to claim 1, wherein the portable electronic device is selected from the group consisting of a notebook, a tablet device, a personal digital assistant (PDA), and a mobile phone.

7. A method for controlling a screen protection function of a portable electronic device, the portable electronic device comprising a gravity sensor and a display screen, the method comprising:
setting a tilt angle range for placement of the portable electronic device, and storing the tilt angle range in a storage system of the portable electronic device;
detecting a horizontal vector and a vertical vector of a gravitational acceleration of the portable electronic device using the gravity sensor;

calculating a tilt angle of the portable electronic device according to the horizontal vector and the vertical vector;

determining whether the tilt angle exceeds the preset tilt angle range; and activating a screen protection program of the portable electronic device to control the display screen to enter into a power saving mode if the tilt angle exceeds the preset tilt angle range; or terminating the screen protection program to control the display screen to enter into a normal display mode if the tilt angle does not exceed the preset tilt angle range.

8. The method according to claim 7, wherein the tilt angle of the portable electronic device is calculated according to an inverse trigonometric function of the horizontal vector and the vertical vector.

9. The method according to claim 7, wherein the gravity sensor is a voltage sensor, a capacitive sensor, or an inductive sensor.

10. The method according to claim 7, wherein the power saving mode is defined as a display mode of the display screen that works in a low power state when the display screen is free.

11. The method according to claim 7, wherein the normal display mode is defined as a display mode of the display screen for normally displaying information of the portable electronic device when the display screen is being used.

12. The method according to claim 7, wherein the portable electronic device is selected from the group consisting of a notebook, a tablet device, a personal digital assistant (PDA), and a mobile phone.

13. A non-transitory storage medium having stored thereon instructions that, when executed by at least one processor of a portable electronic device, cause the processor to perform a method for controlling a screen protection function of the portable electronic device, the portable electronic device comprising a gravity sensor and a display screen, the method comprising:

setting a tilt angle range for placement of the portable electronic device, and storing the tilt angle range in a storage system of the portable electronic device;

detecting a horizontal vector and a vertical vector of a gravitational acceleration of the portable electronic device using the gravity sensor;

calculating a tilt angle of the portable electronic device according to the horizontal vector and the vertical vector;

determining whether the tilt angle exceeds the preset tilt angle range; and activating a screen protection program of the portable electronic device to control the display screen to enter into a power saving mode if the tilt angle exceeds the preset tilt angle range; or terminating the screen protection program to control the display screen to enter into a normal display mode if the tilt angle does not exceed the preset tilt angle range.

14. The storage medium according to claim 13, wherein the tilt angle of the portable electronic device is calculated according to an inverse trigonometric function of the horizontal vector and the vertical vector.

15. The storage medium according to claim 13, wherein the gravity sensor is a voltage sensor, a capacitive sensor, or an inductive sensor.

16. The storage medium according to claim 13, wherein the power saving mode is defined as a display mode of the display screen that works in a low power state when the display screen is free.

17. The storage medium according to claim 13, wherein the normal display mode is defined as a display mode of the display screen for normally displaying information of the portable electronic device when the display screen is being used.

18. The storage medium according to claim 13, wherein the portable electronic device is selected from the group consisting of a notebook, a tablet device, a personal digital assistant (PDA), and a mobile phone.

\* \* \* \* \*